Feb. 24, 1925. 1,527,899
P. MOLNÁR
PLOW
Filed May 15, 1924 2 Sheets-Sheet 1

Inventor
P. Molnár

By Bryant & Lowry
Attorney

Feb. 24, 1925.
P. MOLNÀR
PLOW
Filed May 15, 1924    2 Sheets-Sheet 2
1,527,899
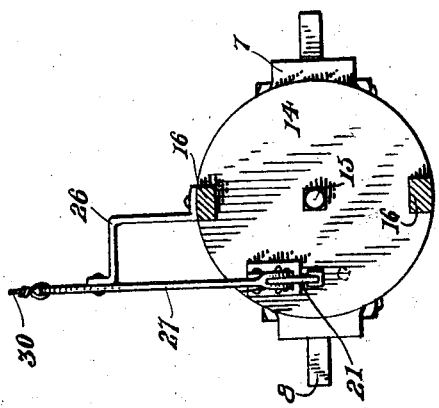
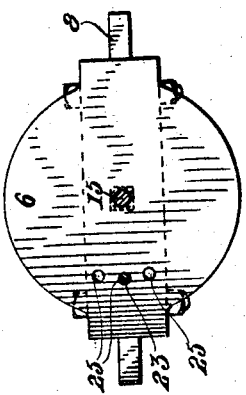
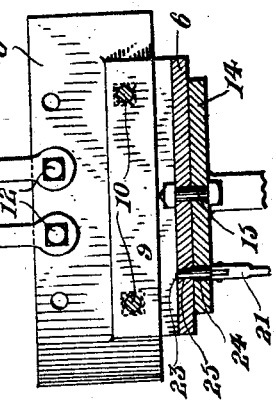
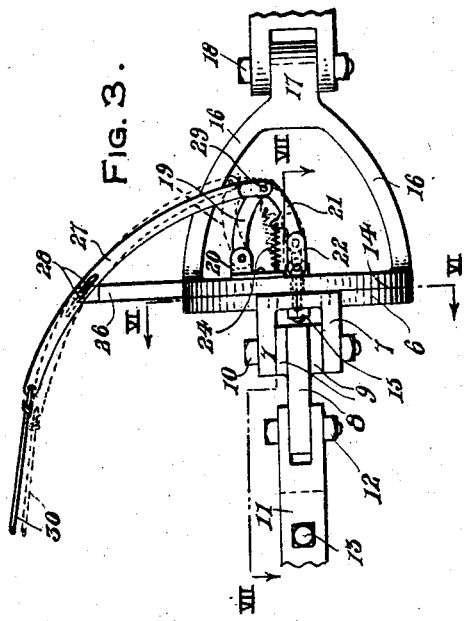
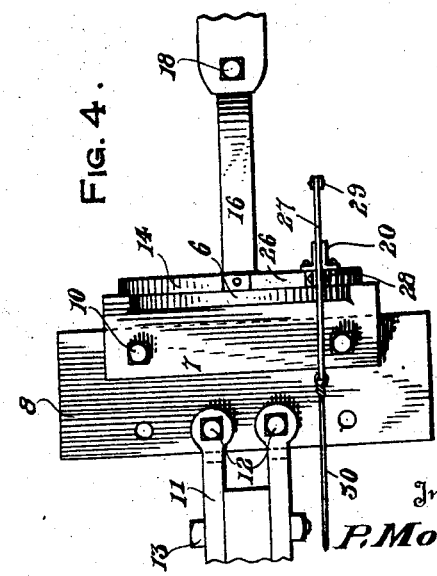
Inventor
P. Molnàr
By Bryant & Lowry
Attorneys Patented Feb. 24, 1925.

1,527,899

UNITED STATES PATENT OFFICE.

PAUL MOLNÀR, OF ELYRIA, OHIO, ASSIGNOR OF ONE-HALF TO STEVE T. HELLI, OF ELYRIA, OHIO.

PLOW.

Application filed May 15, 1924. Serial No. 713,524.

*To all whom it may concern:*

Be it known that I, PAUL MOLNÀR, a citizen of Hungary, residing at Elyria, in the county of Lorain and State of Ohio, have invented certain new and useful Improvements in Plows, of which the following is a specification.

This invention relates to certain new and useful improvements in plows and has particular reference to a plow having the forward end of the carrying beam therefor adjustably associated with a plate upon a wheeled carriage whereby the plow beam may be reversely rotated for disposing the plow at different inclinations or side hill and level ground work.

A further object of the invention is to provide an adjustable plow mounting of the type above set forth that is operable from the handle end of the plow to permit the plow to be shifted to different angular positions by the operator during the act of plowing.

With the above and other objects in view and others that will become apparent as the nature of the invention is better understood, the same consists of the novel form, combination and arrangement of parts hereinafter more fully described, shown in the accompanying drawings and claimed.

Figure 1:
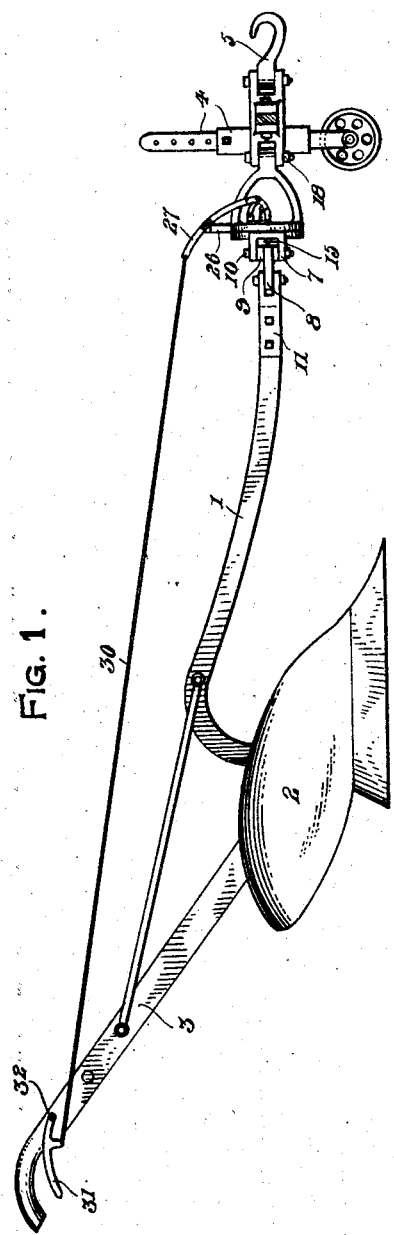
Figure 2:
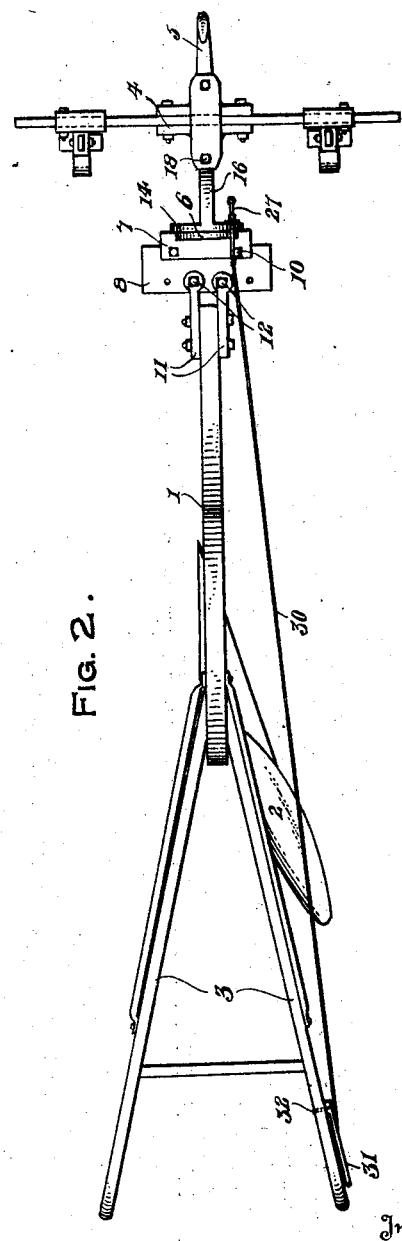

In the drawings, wherein like reference characters designate corresponding parts throughout the several views, Figure 1 is a side elevational view of a plow constructed in accordance with the present invention, illustrating an angularly adjustable plow and operating means therefor terminating at the handle end of the plow for adjusting the angularity of the plow, Figure 2 is a top plan view of the same, Figure 3 is an enlarged fragmentary side elevational view showing the adjustable devices for the plow mounting and with the latch pin for retaining the devices in adjusted positions shifted to a releasing position as illustrated by dotted lines, Figure 4 is a fragmentary top plan view of the devices shown in Fig. 3, Figure 5 is a vertical cross-sectional view showing the manner of mounting the tensioned latch pin for the adjustable mounting members, Figure 6 is a vertical cross-sectional view taken on line VI—VI of Fig. 3 showing the single latch pin and three-hole adjustment therefor, and Figure 7 is a horizontal sectional view taken on line VII—VII of Fig. 3.

The plow embodies a beam 1 that supports a plow 2 at the rear end thereof and with which beam rearwardly directed handle bars 3 are associated while a wheeled carriage 4 carrying a draft clevis 5 is adjustably connected to the forward end of the plow beam 1 as shown in Figs. 1 and 2.

The adjustable connection between the plow beam 1 and carriage 4 includes a disk plate 6 traversing the forward end of the plow beam 1 and spaced therefrom, the rear face of the disk plate 6 carrying a pair of parallel strap members 7 having a plate 8 clamped therebetween and centrally positioned by the spacing members 9 with the plate 8 retained therein by the securing bolts 10. The rear side edge of the plate 8 is straddle by the rearwardly directed bifurcated ends of the clamping plate 11 with the bifurcated ends bolted as at 12 to said plate 8 and with the forward end of the clamping members 11 bolted as at 13 to the forward end of the plow beam 1.

A disk plate 14 is associated with the disk 6 and is positioned forwardly thereof as illustrated and in flat engagement, the disk plates 6 and 14 being pivotally connected by the pin 15 as clearly illustrated in Fig. 7 that is positioned axially thereof. The disk plate 14 is connected to the wheeled carriage by the forwardly directed bracket arms 16 projecting from the upper and lower edges of the disk plate 14 and terminating in a single extension 17 having a clevis connection 18 with the wheeled carriage as clearly illustrated in Fig. 3.

To retain the disk plates 6 and 14 in adjusted positions and also for accommodating relative movement thereof when it is desired to vary the angularity of the plow relative to the wheeled carriage, tensioned latch mechanism is associated with the two disk plates 6 and 14 and includes a lever 19 pivotally mounted at one end upon the bracket 20 carried by the forward face of a disk 14, the outer end of the lever 19 being pivotally connected to the link 21 directed toward the disk 14 and having associated with the free end thereof a second link 22 that carries a latch pin 23, a coil spring 24 being interposed between the link 21 and bracket 20 for normally influencing the latch pin 23 in a direction toward the disk 14. The disk 14 has a single opening 24 to accommodate the passage of the latch pin 23, and the disk plate 6 is provided with a series of openings 25 for the selective reception of the latch pin. An angle bracket 26 extends upwardly from the disk plate 14 and a curved lever 27 has a pin and slot connection 28 with the upper end of said bracket, the forward lower end of the lever 27 being pivotally connected as at 29 to the forward pivotal connection between the link members 19 and 21 while an operating rod or flexible connection 30 extends between the rear end of the lever 27 and the operating hand grip 31 pivotally mounted as at 32 upon one of the handle bars 3.

The clevis connection 17—18 provides for lateral swinging movement of the plow 2 relative to the wheeled carriage 4 and with the plow 2 vertically positioned relative to the carriage, the latch pin 23 is positioned in one of the openings 25 in the disk plate 6. When it is desired to dispose the plow 2 at an angle with respect to the vertical axis of the wheeled carriage, the hand grip 31 is operated to shift the lever 27 and move the link members 19 and 21 against the tension of the spring 24 to remove the latch pin 23 from the opening 25 and by tilting the plow beam 1 and plow to either side, the latch pin 23 is positioned to be received in one of the other openings 25 for locking the plow 2 in its angularly adjusted position. The angular adjusting of the plow may be accomplished at any time either when the plow is stationary or in use and the latch pin connection between the disk plates 6 and 14 will effectively hold the plow in its adjusted position.

While there is herein shown and described the preferred embodiment of the present invention, it is nevertheless to be understood that minor changes may be made therein without departing from the spirit and scope of the invention as claimed.

What is claimed as new is:—

1. In a device of the type described, a plow beam, a plow carried thereby, handle bars associated therewith, a wheeled carriage, and means for connecting the plow beam to the wheeled carriage for permitting the disposing of the plow at different angular positions in respect to the wheeled carriage, said means including a disk plate connected to the plow beam, a second disk plate centrally rotatably connected to the first mentioned disk plate, forwardly converging arms rigidly connected together at their outer ends and to the second disk plate at their inner ends, means for connecting the outer ends of said arms to the wheeled carriage, means for adjustably connecting said disk plates outwardly of their point of pivotal connection, and means manually operable from the handle bars for controlling the last mentioned means.

2. In a device of the type described, a plow beam, a plow carried thereby, handle bars associated therewith, a wheeled carriage, and means for connecting the plow beam to the wheeled carriage for permitting the arranging of the plow at different angular positions in respect to the wheeled carriage, said means including a disk plate connected to the plow beam, a second disk plate centrally rotatably connected to the first mentioned disk plate, means for connecting the second disk plate to the wheeled carriage, a bracket carried by the second disk plate, a curved lever slidably pivotally connected to said bracket, a lever pivotally connected to the second disk plate and the curved lever, a link connected to the curved lever, means carried by said link for selectively connecting said disk plates at different positions in respect to each other, resilient means for normally holding the last mentioned means in its operative position, and means for manually operating said curved lever for permitting rotary movement of said disk plates in respect to each other.

In testimony whereof I affix my signature.

PAUL MOLNAR.